(12) United States Patent
Fishler

(10) Patent No.: US 9,752,587 B2
(45) Date of Patent: Sep. 5, 2017

(54) VARIABLE BLEED SLOT IN CENTRIFUGAL IMPELLER

(71) Applicant: UNITED TECHNOLOGIES CORPORATION, Hartford, CT (US)

(72) Inventor: Benjamin E. Fishler, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 607 days.

(21) Appl. No.: 14/301,893

(22) Filed: Jun. 11, 2014

(65) Prior Publication Data

US 2014/0369804 A1    Dec. 18, 2014

Related U.S. Application Data

(60) Provisional application No. 61/836,016, filed on Jun. 17, 2013.

(51) Int. Cl.
| | |
|---|---|
| *F04D 27/02* | (2006.01) |
| *F04D 29/68* | (2006.01) |
| *F04D 29/42* | (2006.01) |
| *F01D 9/04* | (2006.01) |
| *F01D 17/14* | (2006.01) |
| *F02C 6/08* | (2006.01) |

(52) U.S. Cl.
CPC ......... *F04D 27/0215* (2013.01); *F01D 9/045* (2013.01); *F01D 17/143* (2013.01); *F02C 6/08* (2013.01); *F04D 27/023* (2013.01); *F04D 29/4206* (2013.01); *F04D 29/682* (2013.01)

(58) Field of Classification Search
CPC .. F04D 27/0215; F04D 27/023; F04D 29/682; F02C 6/08; F16K 17/34; Y10T 137/7784
USPC ................................................. 138/1, 43, 46
See application file for complete search history.

(56) References Cited

U.S. PATENT DOCUMENTS

| | | | | |
|---|---|---|---|---|
| 3,887,295 | A * | 6/1975 | Yu | F04D 29/681 415/116 |
| 5,313,779 | A * | 5/1994 | Rodgers | F04D 27/0246 60/785 |
| 5,340,271 | A * | 8/1994 | Freeman | F04D 27/0215 415/1 |
| 5,380,151 | A * | 1/1995 | Kostka | F04D 27/0215 415/145 |
| 5,729,969 | A * | 3/1998 | Porte | F02C 6/08 60/226.1 |
| 6,648,594 | B1 * | 11/2003 | Horner | F04D 25/04 415/144 |
| 6,672,826 | B2 * | 1/2004 | LeDuc | F04D 27/0238 415/159 |

(Continued)

*Primary Examiner* — Woody Lee, Jr.
(74) *Attorney, Agent, or Firm* — Snell & Wilmer, L.L.P.

(57) ABSTRACT

The present disclosure relates to shroud bleed in centrifugal compressors. An air-limiting component 130 may be located adjacent to a shroud 120. The shroud 120 may have a primary bleed slot 210, and the air-limiting component 130 may have a secondary bleed slot 310. The primary bleed slot 210 and the secondary bleed slot 310 may overlap at an effective bleed slot location. The air-limiting component 130 may rotate relative to the shroud 120, which may change a streamwise location of the effective bleed slot.

9 Claims, 8 Drawing Sheets

(56) References Cited

U.S. PATENT DOCUMENTS

| | | | | |
|---|---|---|---|---|
| 7,025,557 B2 * | 4/2006 | Japikse | ................... | F01D 5/143 |
| | | | | 415/1 |
| 8,061,974 B2 * | 11/2011 | Gu | ...................... | F04D 27/0207 |
| | | | | 415/145 |
| 8,122,724 B2 * | 2/2012 | Slovisky | ............. | F04D 27/0215 |
| | | | | 60/240 |
| 8,616,242 B2 * | 12/2013 | Buseyne | ................... | F16K 1/22 |
| | | | | 137/625.31 |
| 8,721,264 B2 * | 5/2014 | Behaghel | ................ | F01D 5/082 |
| | | | | 415/115 |

* cited by examiner

VARIABLE BLEED SLOT IN CENTRIFUGAL IMPELLER

CROSS-REFERENCE TO RELATED APPLICATIONS

This application is a nonprovisional of, and claims priority to, and the benefit of U.S. Application No. 61/836,016, entitled "VARIABLE BLEED SLOT IN CENTRIFUGAL IMPELLER," filed on Jun. 17, 2013, which is hereby incorporated by reference in its entirety.

FIELD

The present disclosure relates generally to turbomachinery. More particularly, the present disclosure relates to shroud bleed in centrifugal impellers.

BACKGROUND

Centrifugal compressors are often used in turbomachinery to add kinetic energy to a fluid. An impeller typically accelerates the fluid, and a diffuser typically slows the fluid, creating an increase in pressure. A collector downstream of the diffuser often collects the pressurized fluid.

Centrifugal compressors have a limited operating range due to instabilities that may arise in the system at surge or stall conditions. In certain cases, the compressor cannot add enough energy to overcome the backpressure in the turbomachine. A surge may result, and the flow of fluid may temporarily reverse directions and exit out the inlet of the compressor. This surge may create problems, including high vibration and changes in thrust, and in some cases, can damage the turbomachine.

SUMMARY

According to various embodiments, a system with a variable bleed slot location is disclosed. The system may comprise a shroud with a primary bleed slot and an air-limiting component with a secondary bleed slot. The air-limiting component may be disposed adjacent to the shroud, and may be configured to rotate relative to the shroud.

The primary bleed slot may be positioned at an angle relative to the secondary bleed slot, and a portion of the primary bleed slot may overlap a portion of the secondary bleed slot at an effective slot location. Thus, a streamwise location of an effective slot location may vary based on an angular position of the air-limiting component.

According to various embodiments, a centrifugal compressor is disclosed. The centrifugal compressor may comprise an impeller, a shroud, an air-limiting component, a plurality of bearings, and an actuator. The shroud may be located adjacent to the impeller, and the shroud may comprise a plurality of primary bleed slots. The air-limiting component may be located adjacent to the shroud, and the air-limiting component may comprise a plurality of secondary bleed slots overlapping the plurality of primary bleed slots. The plurality of bearings may be located between the shroud and the air-limiting component. The actuator may be configured to rotate the air-limiting component. In response to the actuator rotating the air-limiting component, an overlapping position of the plurality of primary bleed slots and the plurality of secondary bleed slots may vary.

According to various embodiments, a method for changing the streamwise location of an effective bleed slot is disclosed. The method may include determining an optimal shroud bleed location in a centrifugal compressor. An air-limiting component may be rotated relative to a shroud, such that a bleed slot in the air-limiting component may overlap a bleed slot in the shroud at the optimal shroud bleed location. The optimal shroud bleed location may be determined by iteratively measuring the efficiency of the centrifugal compressor.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A centrifugal compressor comprising a variable location bleed slot is disclosed. The centrifugal compressor may include a shroud with a primary bleed slot, and an air-limiting component with a secondary bleed slot. The air-limiting component may be located adjacent to the shroud, and may be configured to rotate with respect to the shroud. In various embodiments, the air-limiting component may be substantially the same shape as at least a portion of the shroud.

The air-limiting component may comprise a secondary bleed slot. The secondary bleed slot may be positioned at an angle offset from the primary bleed slot. Thus, by rotating the air-limiting component, the primary bleed slot and the secondary bleed slot may overlap at varying locations. The location where the primary bleed slot and the secondary bleed slot overlap may function as the effective bleed slot location. Stated another way, the majority of air bleed will occur where and when the primary bleed slot and the secondary bleed slot overlap. Thus, by varying the overlapping location, the streamwise location of the effective bleed slot location may be selected based on operating conditions. "Streamwise" as used herein may refer to a path that an air particle follows through a centrifugal compressor. A streamwise distance may refer to a distance measured along a streamwise path between two points.

Figure 1:
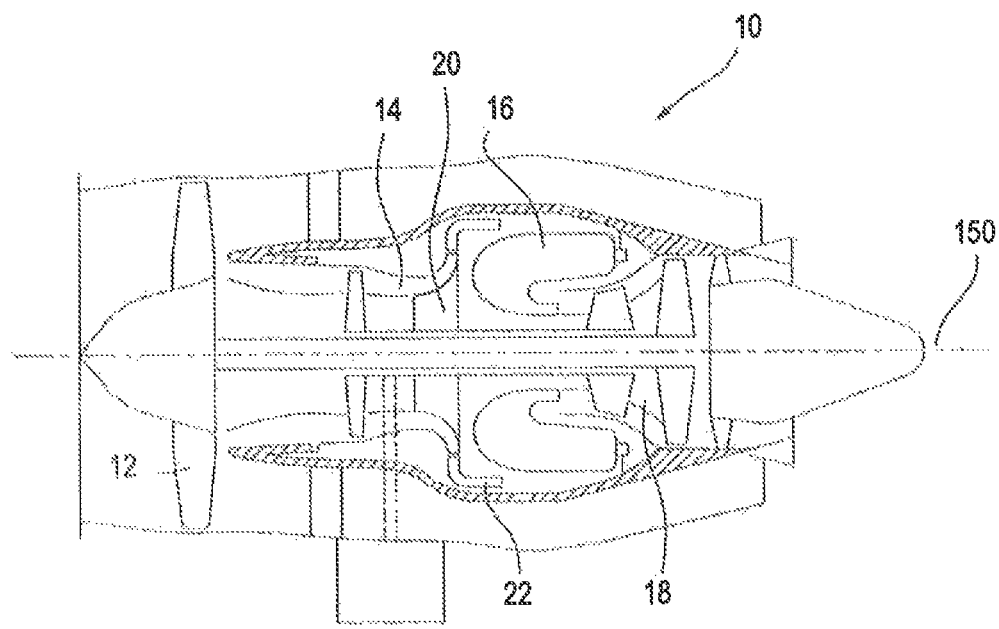
FIG. 1 illustrates a schematic axial cross-section view showing an example of a gas turbine engine according to various embodiments.

Referring to FIG. 1, a gas turbine engine 10 is illustrated according to various embodiments. The engine 10 may comprise a fan 12 through which ambient air is propelled, a centrifugal compressor 14 for pressurizing the air, a combustor 16 in which the compressed air is mixed with fuel and ignited for generating an annular stream of hot combustion gases, and a turbine section 18 for extracting energy from the combustion gases. In various embodiments, one or more of the previous components, such as fan 12, may not be present. Various components of engine 10 may rotate about axis of rotation 150. The centrifugal compressor 14 may comprise centrifugal impeller 20 which directs the pressurized air into diffuser vanes 22. Axis of rotation 150 may define the forward-aft position of engine 10. For example, fan 12 may be referred to as forward of turbine section 18 and turbine section 18 may be referred to as aft of fan 12. As air flows from fan 12 to the more aft components of gas turbine engine 10, axis of rotation 150 may also generally define the net direction of the air stream flow. However, the direction of the air stream flow may vary through the individual components. For example, the air flow may be radial in an exducer section of centrifugal impeller 20. The present disclosure is applicable to other types of turbine engines, such as auxiliary power units (APU), turbo-shaft units, and turbo-prop units.

Figure 2:
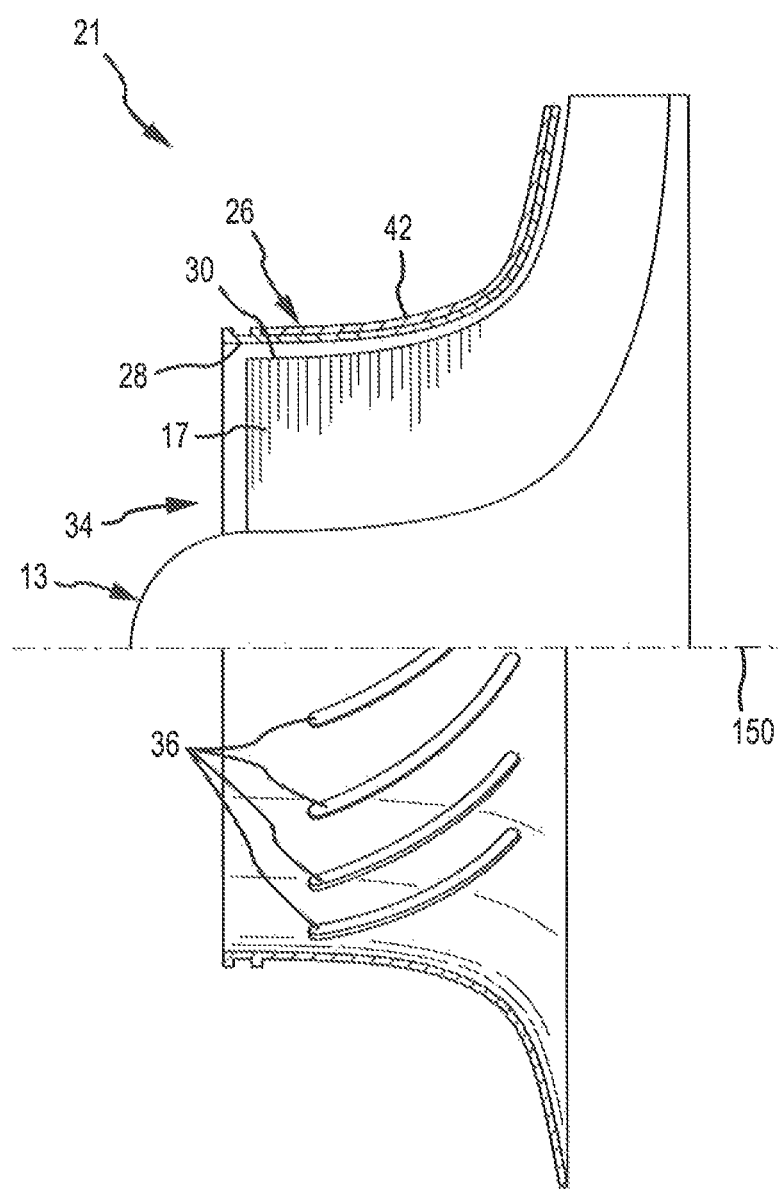
FIG. 2 illustrates a schematic cross-section view showing a compressor section of a gas turbine engine according to various embodiments.

Referring to FIG. 2, a portion of a centrifugal compressor 21 is illustrated according to various embodiments. The centrifugal compressor 21 may comprise an impeller 13 mounted for rotation about axis of rotation 150. The impeller 13 may comprise a plurality of radially extending impeller vanes 17. The centrifugal compressor 21 may further comprise a casing 26 including a stationary cylindrical shroud 28 disposed adjacent the radial outer ends or tips 30 of the impeller vanes 17. The casing 26 may further comprise an air-limiting component 42. The shroud 28 may comprise a plurality of primary bleed slots 36 beginning in inducer section 34. Any number of primary bleed slots 36 may be present, and the primary bleed slots 36 may be located at any portion of the shroud 28.

Figure 3:
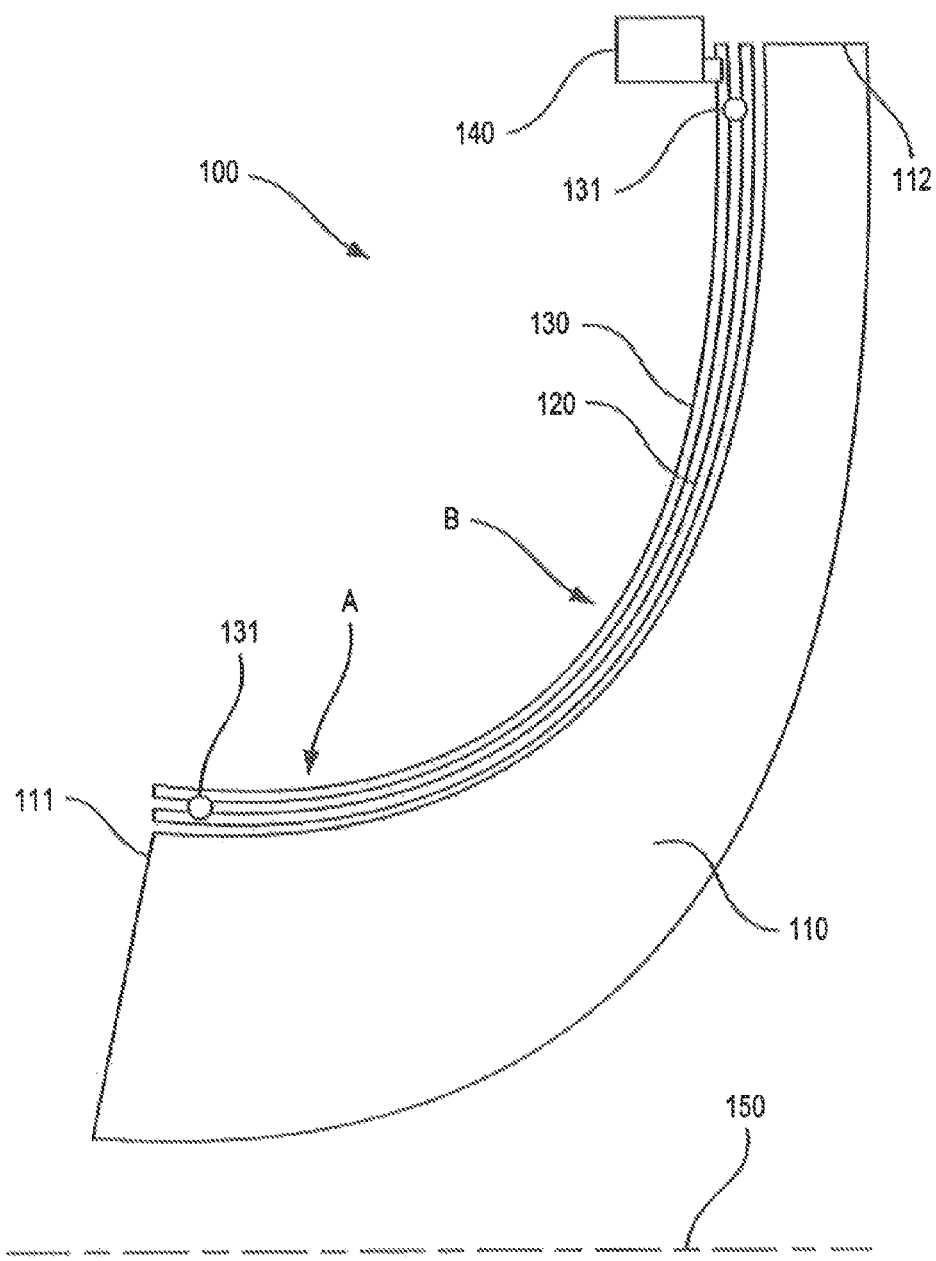
FIG. 3 illustrates a meridional projection of a centrifugal compressor according to various embodiments.

Referring to FIG. 3, a meridional view of a centrifugal compressor 100 is illustrated according to various embodiments. The centrifugal compressor may comprise an impeller 110, a shroud 120, an air-limiting component 130, and an actuator 140.

Impeller 110 may comprise leading edge 111 in the inducer region, and trailing edge 112 in the exducer region. Shroud 120 may be located adjacent to impeller 110. Air-limiting component 130 may be disposed adjacent to shroud 120. Air-limiting component 130 is illustrated disposed adjacent to an exterior surface of shroud 120. However, in various embodiments, air-limiting component 130 may be disposed adjacent to an interior surface of shroud 120. Additionally, in various embodiments, air-limiting component 130 may be integrated into shroud 120.

Air-limiting component 130 may contact bearings 131. Bearings 131 may allow air-limiting component 130 to rotate relative to shroud 120 with minimal friction. Bearings 131 may comprise any type of bearings which allow air-limiting component 130 to rotate relative to shroud 120. In various embodiments, bearings 131 may sit within a groove in shroud 120 and/or air-limiting component 130. Air-limiting component 130 may rotate about axis of rotation 150. However, in various embodiments, air-limiting component 130 may remain stationary and shroud 120 may rotate relative to air-limiting component 130, or in various embodiments both shroud 120 and air-limiting component 130 may rotate. Axis of rotation 150 may also be the axis of rotation for impeller 110. In various embodiments, air-limiting component 130 comprises a single continuous member corresponding to shroud 120. However, in various embodiments, air-limiting component 130 may comprise a plurality of discrete members which correspond to one or more bleed slots in shroud 120.

The centrifugal compressor 100 may further comprise actuator 140. Actuator 140 may comprise any type of motor capable of at least partially rotating air-limiting component 130. In various embodiments, actuator 140 may comprise one or more gears which contact air-limiting component 130 in order to rotate air-limiting component 130. In various embodiments, actuator 140 may utilize electromagnetism, hydraulics, pneumatics, or any other energy source in order to rotate air-limiting component 130. In various embodiments, a gear in actuator 140 may correspond to a track or chain on air-limiting component 130, such that in response to actuator 140 rotating the gear, the gear causes air-limiting component 130 to rotate about axis of rotation 150.

The rotational position of air-limiting component 130 may determine the streamwise location of the effective bleed slot. For example, when air-limiting component 130 is in a first position, the secondary bleed slot of air-limiting component 130 may overlap the primary bleed slot of shroud 120 at point A. Thus, shroud bleed may occur at point A. However, due to the offset angle between the primary bleed slot and the secondary bleed slot, when air-limiting component 130 is rotated to a second position, the secondary bleed slot may overlap the primary bleed slot at point B. Thus, shroud bleed may occur at point B which is at a greater streamwise distance than point A from axis of rotation 150. Based on the angular position of air-limiting component 130, an infinite number of effective bleed slot locations may be utilized. Therefore, by rotating air-limiting component 130, the streamwise location of the effective bleed slot may be controlled.

Figure 4:
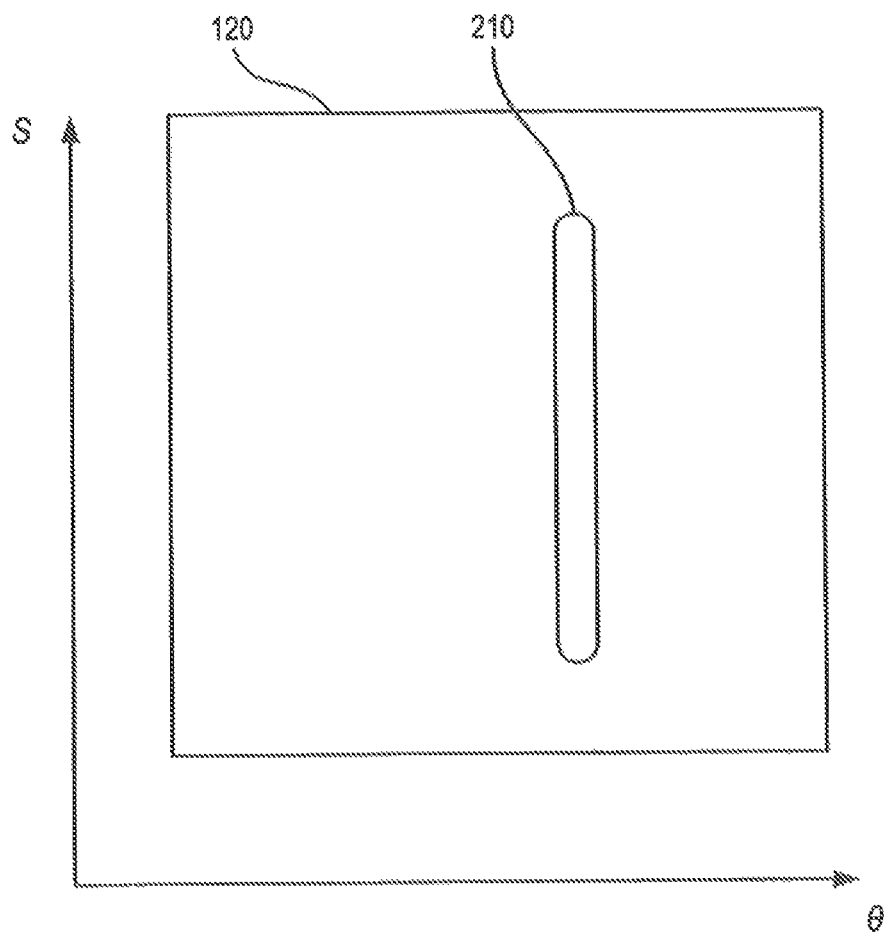
FIG. 4 illustrates a shroud with a primary bleed slot according to various embodiments.

Referring to FIG. 4, a shroud 120 is illustrated according to various embodiments. FIG. 4 illustrates shroud 120 flattened out by rotational angle θ and normalized streamwise distance S. Thus, moving left to right in the illustration represents moving around the axis of rotation, and moving from bottom to top in the illustration represents moving in a streamwise direction. Thus, although primary bleed slot 210 appears linear in the illustration, primary bleed slot 210 as illustrated follows the streamwise path, which is curved in three dimensions in many embodiments.

Although illustrated as substantially linear following the streamwise path, primary bleed slot 210 may comprise any shape or orientation. For example, primary bleed slot may comprise a rectangle, an ellipse, a crescent, or any other shape including irregular shapes.

Shroud 120 may comprise any number of primary bleed slots 210. For example, in various embodiments, shroud 120 may comprise one primary bleed slot 210 per impeller vane. However, in various embodiments, shroud 120 may comprise a plurality of primary bleed slots 210 per impeller vane, or less than one primary bleed slot 210 per impeller vane, such as one primary bleed slot 210 for every other impeller vane.

Figure 5:
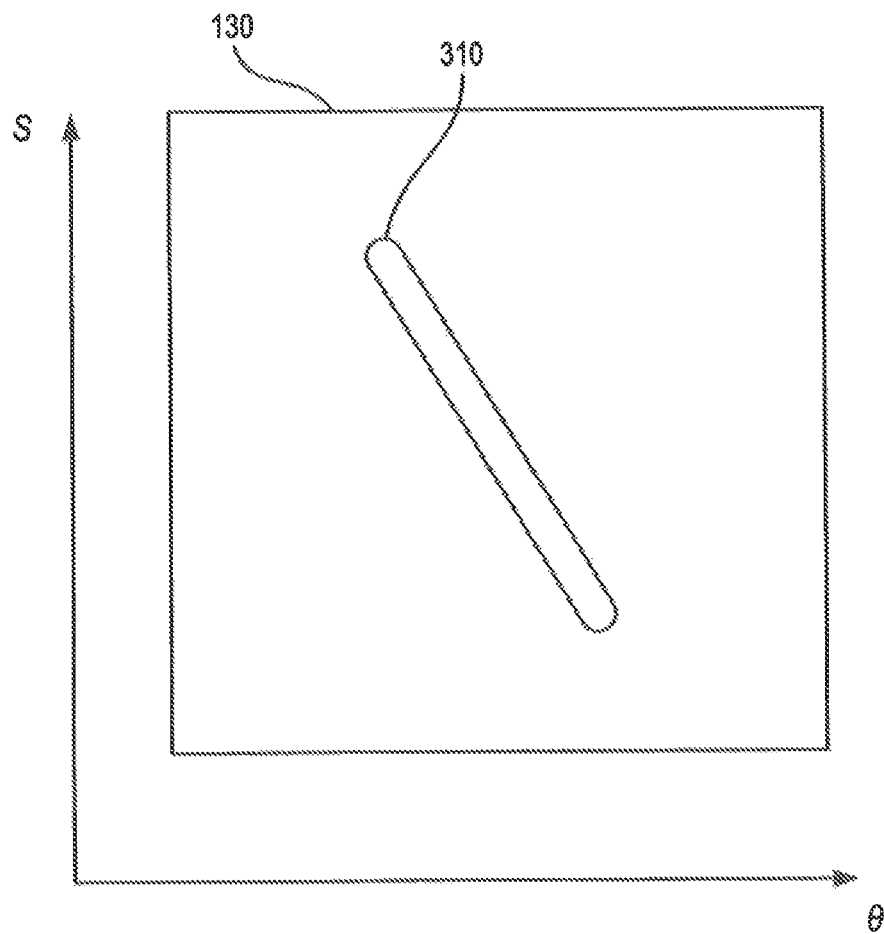
FIG. 5 illustrates an air-limiting component with a secondary bleed slot according to various embodiments.

Referring to FIG. 5, an air-limiting component 130 is illustrated according to various embodiments. Similar to the view illustrated in FIG. 4, FIG. 5 illustrates air-limiting component 130 flattened out by rotational angle θ and normalized streamwise distance S. However, secondary bleed slot 310 is positioned at an angle relative to primary bleed slot 210. Thus, when air-limiting component 130 is positioned adjacent to shroud 120, primary bleed slot 210 and secondary bleed slot 310 will not be parallel.

Secondary bleed slot 310 may comprise any shape or orientation. In various embodiments, secondary bleed slot may be aligned along the streamwise direction, and primary bleed slot 210 may be positioned at an angle relative to the streamwise direction. However, in various embodiments, neither the primary bleed slot 210 nor the secondary bleed slot 310 are aligned along the streamwise direction. In various embodiments, a portion of secondary bleed slot 310 may overlap the entire primary bleed slot 210 when aligned. Thus, when maximum shroud bleed is required, air-limiting component 130 may be rotated such that secondary bleed slot 310 overlaps the entire primary bleed slot 210, allowing air to bleed through the entire primary bleed slot 210. So long as the primary bleed slot 210 and the secondary bleed slot 310 are non-congruous or non-parallel, at least one of the location or size of the effective bleed slot may vary in response to the air-limiting component rotating.

Figure 6:
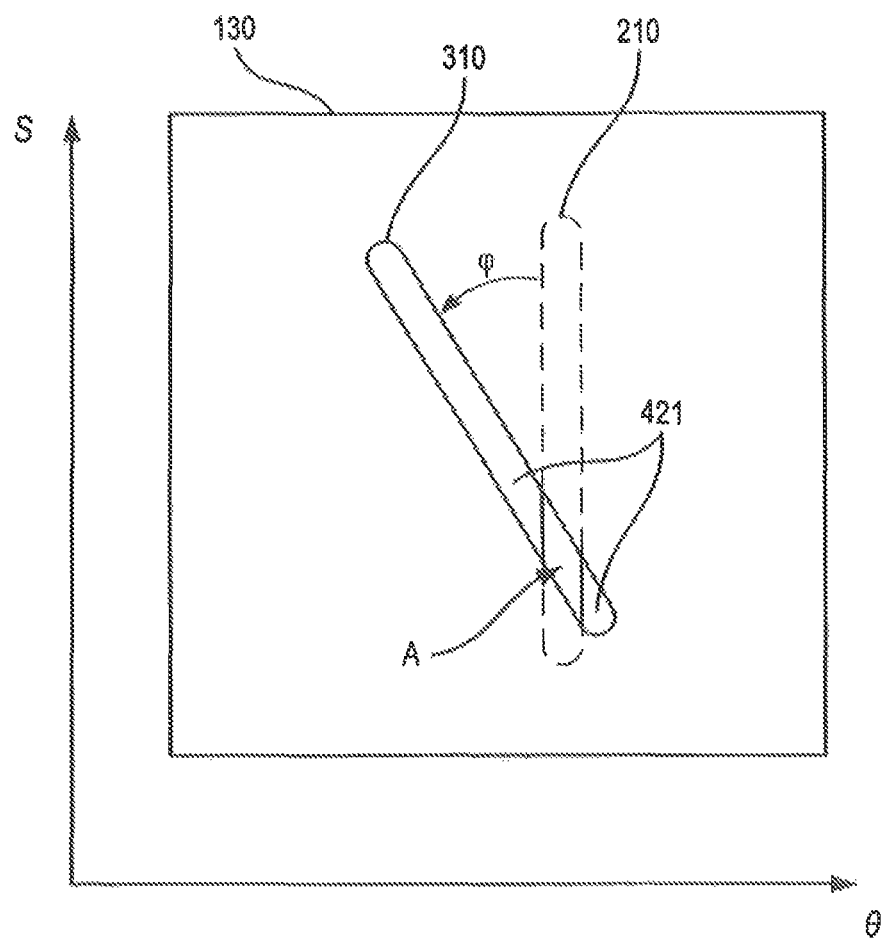
FIG. 6 illustrates a shroud and an air-limiting component creating an effective bleed slot location at an upstream portion of the primary bleed slot according to various embodiments.

Referring to FIG. 6, an air-limiting component 130 is illustrated disposed over a shroud 120. Exposed portions 421 of shroud 120 may be seen through air-limiting component 130. In region A, primary bleed slot 210 and secondary bleed slot 310 overlap, such that fluid may pass through shroud 120 and air-limiting component 130 via the effective bleed slot at region A in an upstream portion of primary bleed slot 210. As illustrated, secondary bleed slot 310 is offset relative to primary bleed slot 210 by an angle φ. In various embodiments, the plurality of primary bleed slots 210 may overlap the plurality of secondary bleed slots 310 at a common streamwise and theta position.

Figure 7:
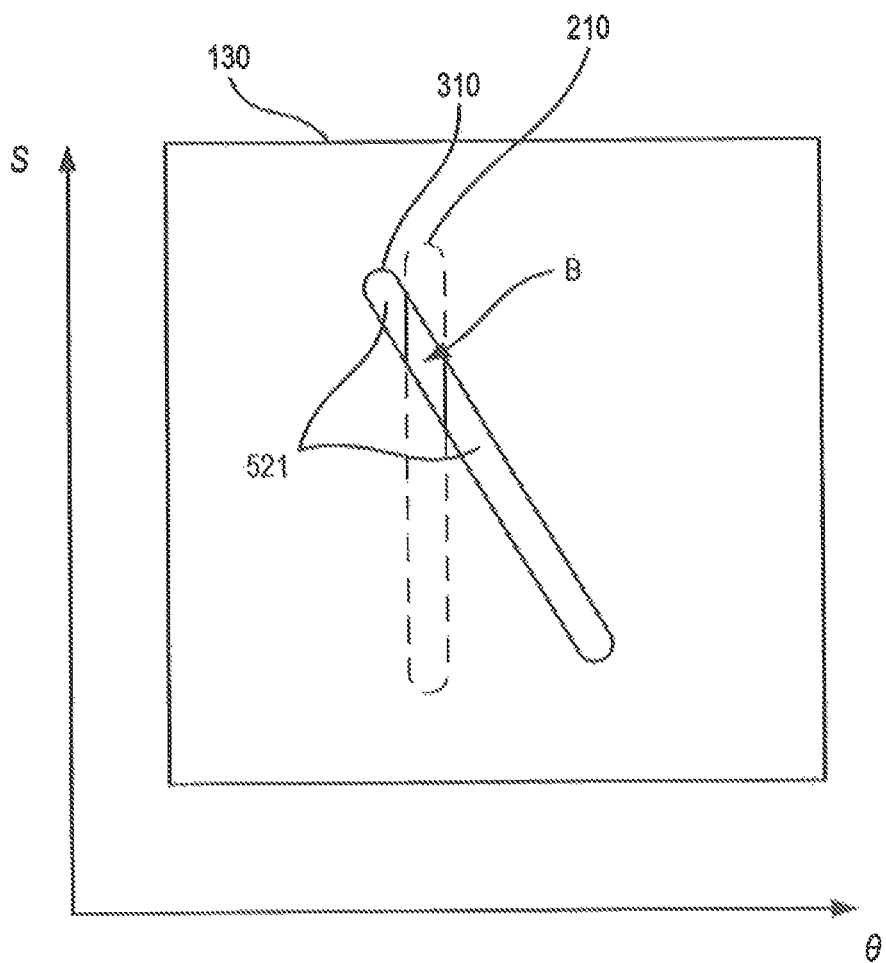
FIG. 7 illustrates a shroud and an air-limiting component creating an effective bleed slot location at a downstream portion of the primary bleed slot according to various embodiments.

Referring to FIG. 7, an air-limiting component 130 is illustrated disposed over shroud 120. In FIG. 7, air-limiting component 130 has been rotated in the θ direction as compared to FIG. 4. Thus, exposed portions 521 of shroud 120 may be seen through secondary bleed slot 310, and secondary bleed slot 310 overlaps primary bleed slot 210 at region B in a downstream portion of primary bleed slot 210, which is located at a larger streamwise distance from the axis of rotation than region A. Therefore, by rotating air-limiting component 130 in the θ direction, the streamwise location of the effective bleed slot can be varied.

Figure 8:
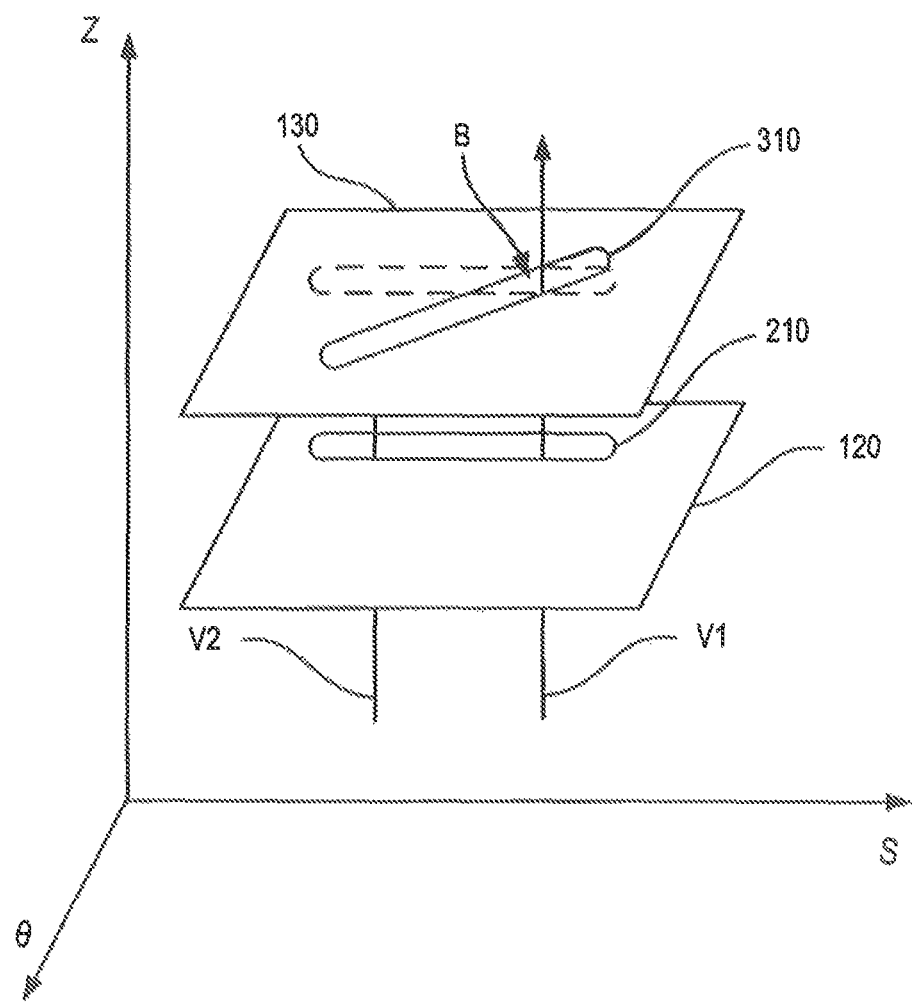
FIG. 8 illustrates a perspective view of a shroud and an air-limiting component according to various embodiments.

Referring to FIG. 8, a perspective view of the flattened shroud 120 and air-limiting component 130 is illustrated. The distance between shroud 120 and air-limiting component 130 is exaggerated for illustrative purposes. An image of primary bleed slot 210 is projected on air-limiting component 130 in dotted lines. As in FIG. 7, secondary bleed slot 310 overlaps primary bleed slot 210 at region B. In this configuration, fluid may bleed through primary bleed slot 210 via paths V1 and V2. Fluid bleeding through path V1 also bleeds through secondary bleed slot 310. However, outside of region B, fluid bleeding through primary bleed slot 210, for example via path V2, may be blocked by air-limiting component 130.

In various embodiments, secondary bleed slot 310 may be substantially perpendicular to primary bleed slot 210. At least one of primary bleed slot 210 and secondary bleed slot 310 may vary in width. Thus, as air-limiting component 130 is rotated, the effective size of the effective bleed slot may increase or decrease, even though the effective streamwise position of the effective bleed slot may remain substantially constant. In various embodiments, for example where primary bleed slot 210 is offset at a non-perpendicular angle from secondary bleed slot 310 and where at least one of primary bleed slot 210 and secondary bleed slot 310 varies in width, both the effective streamwise position and the effective size of the bleed slot may vary as air-limiting component 130 is rotated.

The optimal streamwise position for the effective bleed slot, as varied by the position of air-limiting component 130 may be determined by a variety of methods. For example, the desired streamwise position of the effective bleed slot may be optimized for a given operating point through physical testing or computational fluid dynamic simulations. In various embodiments, in order to diminish acoustics, frequency and sound pressure levels ("SPL") may be measured for various effective bleed slot locations, and an optimal effective bleed slot location may be selected which minimizes acoustics. In various embodiments, pressure and temperature measurements may be taken at the inlet and at the entrance to the combustor region. The effective slot location may be varied, and an optimal effective bleed slot location may be selected in order to maximize efficiency closest to a design point mass flow. In various embodiments, the effective bleed slot location may be selected to improve reliability. The location may be based on readings from pressure transducers or strain gauges on the blade, laser vibrometry, or erosion patterns on the blade tips. In various embodiments, if an engine has an operating region where it will be operating for an extended period of time, air-limiting component 130 may be rotated such that primary bleed slot 210 and secondary bleed slot 310 do not overlap, substantially eliminating all shroud bleed, in order to achieve optimal efficiency until shroud bleed is again required.

In various embodiments, air-limiting component 130 may be iteratively rotated during engine operation. Air-limiting component 130 may be rotated and efficiency measurements and/or calculations may be taken. The θ position may be adjusted until optimal conditions are measured. In various embodiments, the θ position may be continuously adjusted iteratively throughout engine operation based on the feedback of instantaneous performance measurements.

In various embodiments, an instability may be detected in the system. An instability may be detected when one or more airfoils on the impeller experiences a rotating stall. The rotating stall may disrupt airflow around the surrounding airfoils, and a plurality (or all) airfoils may become stalled, creating a surge. The instability may be detected, for example, by a pressure transducer operatively coupled to the centrifugal compressor 100. In response to detecting the instability, the air-limiting component 130 may be rotated to change the streamwise position of the effective bleed slot in order to correct the instability. For example, an instability may occur near the trailing edge 112 of the impeller. The air-limiting component 130 may be rotated such that the streamwise position of the effective bleed slot is moved toward the trailing edge 112 in order to bleed off air in that region. In response to the instability being corrected, the air-limiting component 130 may rotate back to the previous position. In various embodiments, the air-limiting component 130 rotates automatically without (or regardless of) human intervention in response to changing operating conditions.

In various embodiments, the bleed slot location may cause an aerodynamic forcing function that excites the blades at a natural harmonic. This may cause structural failure if the aerodynamic forcing is not changed. The air-limiting component 130 may be rotated such that the streamwise position of the effective bleed slot changes in order to disrupt the natural harmonic. In various embodiments, the air-limiting component 130 rotates automatically without (or regardless of) human intervention in response to detection of the natural harmonic. The air-limiting component may also rotate automatically without (or regardless of) human intervention in order to optimize acoustic benefits and/or increase reliability.

Although discussed primarily with reference to centrifugal compressors, the present disclosure may be implemented in any system where shroud bleed is desired, which may include axial or mixed-flow compressors.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching may be used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A centrifugal compressor comprising:
   a shroud located adjacent to an impeller, the shroud comprising a plurality of primary bleed slots;
   an air-limiting component located adjacent to the shroud, the air-limiting component comprising a plurality of secondary bleed slots overlapping the plurality of primary bleed slots, wherein the plurality of secondary bleed slots are offset by an angle from the plurality of primary bleed slots;
   a plurality of bearings located between the shroud and the air-limiting component; and
   an actuator configured to rotate the air-limiting component, wherein, in response to the actuator rotating the air-limiting component, an overlapping position of the plurality of primary bleed slots and the plurality of secondary bleed slots varies.

2. The centrifugal compressor of claim 1, wherein the plurality of primary bleed slots and the plurality of secondary bleed slots share a common streamwise position overlap.

3. The centrifugal compressor of claim 1, wherein the air-limiting component is configured to rotate relative to the shroud.

4. The centrifugal compressor of claim 1, wherein a portion of a secondary bleed slot is capable of overlapping an entire primary bleed slot.

5. A method comprising:
   determining a shroud bleed location in a centrifugal compressor, wherein the determining comprises iteratively measuring an efficiency of the centrifugal compressor; and
   rotating an air-limiting component relative to a shroud, such that a bleed slot in the air-limiting component overlaps a bleed slot in the shroud at the shroud bleed location.

6. The method of claim 5, wherein the rotating changes a streamwise distance of where the bleed slots overlap.

7. The method of claim 5, further comprising detecting an instability, and in response to the detecting, rotating the air-limiting component.

8. A centrifugal compressor comprising:
   a shroud located adjacent to an impeller, the shroud comprising a plurality of primary bleed slots;
   an air-limiting component located adjacent to the shroud, the air-limiting component comprising a plurality of secondary bleed slots overlapping the plurality of primary bleed slots, wherein at least one of the plurality of primary bleed slots and the plurality of secondary bleed slots vary in width;

a plurality of bearings located between the shroud and the air-limiting component; and an actuator configured to rotate the air-limiting component, wherein, in response to the actuator rotating the air-limiting component, an overlapping position of the plurality of primary bleed slots and the plurality of secondary bleed slots varies.

9. A method comprising:

determining a shroud bleed location in a centrifugal compressor; and rotating an air-limiting component relative to a shroud, such that a bleed slot in the air-limiting component overlaps a bleed slot in the shroud at the shroud bleed location, wherein the rotating changes a streamwise location of where the bleed slots overlap.

* * * * *